Figure 1:
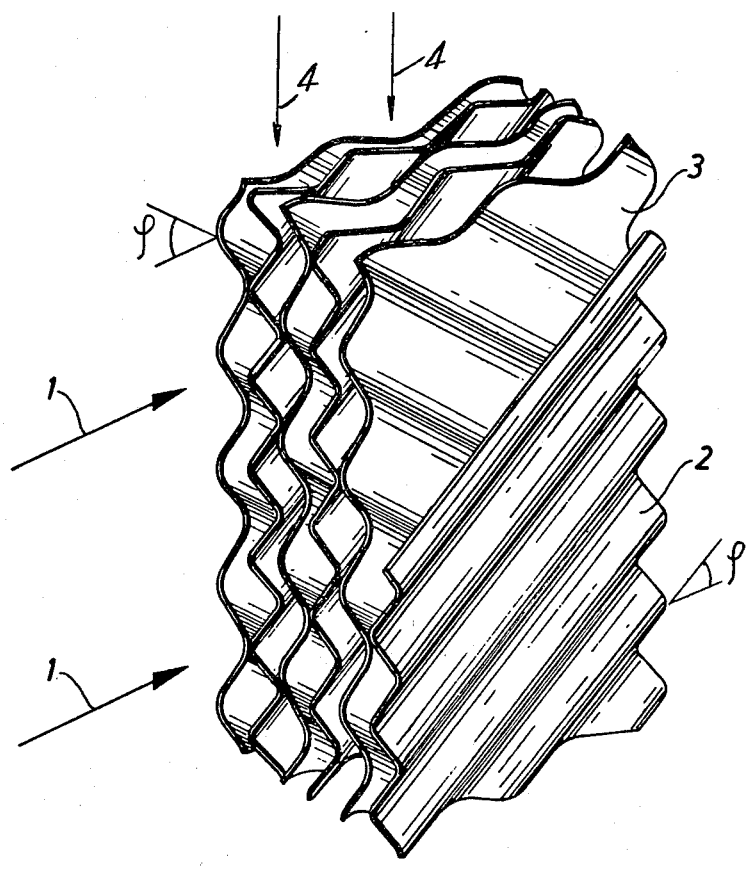

United States Patent [19]

Holmberg

[11] 4,139,584
[45] Feb. 13, 1979

[54] CONTACT BODY FOR LIQUID AND GAS

[75] Inventor: Roy B. Holmberg, Jönköping, Sweden

[73] Assignee: Aktiebolaget Svenska Flaktfabriken, Nacka, Sweden

[21] Appl. No.: 830,400

[22] Filed: Sep. 6, 1977

[30] Foreign Application Priority Data

Sep. 29, 1976 [SE] Sweden .............................. 7610766

[51] Int. Cl.² .............................................. B01D 47/00
[52] U.S. Cl. ............................. 261/112; 261/DIG. 11
[58] Field of Search ...................... 261/DIG. 11, 112; 165/10

[56] References Cited

U.S. PATENT DOCUMENTS

| 3,155,153 | 11/1964 | Axelsson | 261/112 |
| 3,262,682 | 7/1966 | Bredberg | 261/112 |
| 3,369,592 | 2/1968 | Dedow | 165/10 |
| 3,415,502 | 12/1968 | Munters | 261/112 |
| 3,532,157 | 10/1970 | Hubble | 165/10 |
| 3,782,081 | 1/1974 | Munters | 261/112 |
| 3,963,810 | 6/1976 | Holmberg et al. | 261/112 |

Primary Examiner—Frank W. Lutter
Assistant Examiner—Gregory N. Clements
Attorney, Agent, or Firm—Dann, Dorfman, Herrell & Skillman

[57] ABSTRACT

In a device for causing contact between horizontally-flowing gas and vertically-flowing liquid, a stack of corrugated contact plates in face-to-face contact and having their corrugations inclined to the horizontal plane. Alternate plates of the stack are inclined upwardly in the direction of gas flow and the intermediate plates are inclined downwardly at the same angle of inclination. The upwardly-inclined corrugations have a smaller radius of curvature than the downwardly inclined corrugations. The heights of the respective corrugations are preferably equal and the radius of curvature in the upwardly-inclined corrugations is less than the height of said corrugations.

6 Claims, 2 Drawing Figures

CONTACT BODY FOR LIQUID AND GAS

This invention relates to a contact body for liquid and gas, comprising a plurality of parallel folded or corrugated contact plates resting against each other, in which the folds in adjacent plates intersect each other at equal angles of inclination to the horizontal plane, and between which through-passages are formed which are passed through simultaneously by the gas with substantially horizontal flow direction and by the liquid with substantially vertical flow direction. The liquid and the gas can be water and air, respectively, and an important field of application for the invention is in humidifiers. The invention is described in the following with relation to air humidifiers, but is not restricted thereto.

For humidifying air in ventilation installations usually air humidifiers of so-called insert type are used. The air ingoing to them is humidified by passing it through a contact body, the surfaces of which are kept moist by continuous or intermittent wetting. The air usually flows horizontally through the contact body while the water is supplied at the top of the contact body and flows downward along its contact surfaces. The water can be supplied, for example, by means of a system of perforated pipes. The contact body in an air humidifier often is designed so as to comprise a great number of parallel folded contact plates, in which the folds in adjacent plates intersect each other. The passages between the contact plates thus are given a constantly varying width and, consequently, the flow direction of the media repeatedly is changed during the passage through the contact body.

A problem existing in air humidifiers of this type, due to the fact that two adjacent contact plates form a coherent gap, is that the water is subjected by the air stream to a force in the direction of the air stream. This brings about a certain lateral displacement of the water in the contact body. This displacement of the water to the rear edge of the contact body, seen in the direction of the air stream, results in addition to non-uniform water distribution also therein, that water droplets from the moist contact plates more readily are carried over by the air stream. A known way of solving this problem is to position the contact body inclined to the air stream, so that folds facing upward, seen in the air stream direction, are given a steeper angle of inclination to the horizontal plane than folds facing downward, seen in the air stream direction. The water hereby is acted upon by a force against the direction of the air stream which counteracts the lateral displacement of the water caused by the air stream, so that a uniform water distribution over the entire contact body is ensured.

The present invention has the object of providing a better way to ensure a uniform water distribution over the whole contact body and to reduce the carry-over of water. The invention is characterized in that folds in adjacent plates are formed with different radii of curvature, so that the folds facing upward, seen in the air stream direction, have a smaller radius of curvature than the folds facing downward, and thereby provides a channeling force to counteract a lateral displacement of the liquid stream distributed over the plates by action of the air stream. Suitable embodiments are defined in the attached claims.

The invention is based on the understanding that the water supplied to one of the folded contact plates, with folds at a given angle of inclination to the horizontal plane, is acted upon by surface tension forces in downward direction of the folds, so that a certain lateral displacement of the water in said direction is obtained, in such a manner, that folds with a smaller radius of curvature have a greater tendency to retain water in the folds and give rise to a greater lateral displacement of the vertical flow of water than folds with a greater radius of curvature. A contact body of folded contact plates, in which folds in adjacent plates intersect each other and have different radii of curvature, thus, gives rise to a resulting lateral displacement of the supplied water in the direction of the folds extending downward with a smaller radius of curvature. Hereby the lateral displacement of the vertical flow of water caused by the air stream is so counteracted that a uniform water distribution over the entire contact body is ensured.

Figure 2:

The invention is described in greater detail in the following, with reference to the accompanying drawings, in which FIG. 1 is a perspective view of the contact body according to the invention, and FIG. 2 is a cross-section of a contact plate.

The drawing illustrates an air humidifier of the so-called insert type. The air is supplied by air supply means as indicated diagrammatically by the arrows 1 so that it flows horizontally through the contact body while water is supplied by water supply means at the top of the contact body as illustrated diagrammatically by the arrows 4 so that it flows downwardly along the contact surfaces of the body.

As appears from FIG. 1, the contact body is positioned in an air stream 1 and comprises a plurality of vertical folded or corrugated contact plates resting against each other. The folds or corrugations in adjacent plates intersect each other and are joined together in the points of contact by a suitable binder (glue). The folds or corrugations in every second contact plate 2 have the same angle of inclination as the folds or corrugations in intermediate contact plates 3, while the radius of curvature in every second plate 2 is smaller than the radius of curvature in intermediate plates 3. The angle of inclination of the folds to the horizontal plane in the plates 2 and 3, for example, may be $\rho$ equal to 45°. The radius of curvature of the folds in the plates 2 for use in air humidifiers, with reference to the designations in FIG. 2, can amount to $r_2 = 0.5$–3 mm when the fold height is chosen to be $a = 3$–10 mm, while the radius of curvature of the folds in the plates 3 with a fold height of equal size is chosen slightly greater $r_3 = 2$–10 mm. Another field of application for contact bodies according to the invention are cooling towers where the radius of curvature of the folds can amount to $r_2 = 3$–10 mm and $r_3 = 10$–25 mm when the fold height is chosen to be $a = 10$–25 mm. Other additional fields of application are, for example, the recovery of waste heat from a gas and gas absorption. The material of the contact plates advantageously can be hygroscopic, for example paper material, or be coated with a hygroscopic surface layer. The thickness of the plates can vary between 0.05 and 1.0 mm.

I claim:

1. A gas-liquid contact device comprising a contact body, means for supplying a vertical flow of liquid into said body at its upper end and means for supplying a horizontal flow of gas to said body at one edge of said body, said body comprising a plurality of parallel, folded or corrugated upright contact plates resting against each other, the folds in adjacent plates intersecting each other at angles to provide between the plates through-passages which simultaneously are passed through by the gas with substantially horizontal flow direction and by the liquid with substantially vertical flow direction, the folds in one of said adjacent plates inclined upwardly at an angle to the horizontal plane in the direction of the gas flow, and the folds in the other of said adjacent plates inclined downwardly at an equal angle to the horizontal plane in the direction of the gas flow, characterized in that the folds in said adjacent plates are formed with different radii of curvature, so that the radius of curvature of the upwardly inclined folds in said one plate is smaller than the radius of curvature of the downwardly inclined folds in said other plate, said differing radii of curvature combining to provide channeling forces for the water counteracting the tendency of the air stream to effect lateral displacement of the vertical liquid stream distributed over the plates.

2. A contact body according to claim 1, characterized in that the angles of upward and downward inclination of the intersecting folds to the horizontal plane is in the range of 40° to 50°.

3. A contact body according to claim 1, characterized in that the radii of curvature in the upwardly inclined folds amounts to 0.5–3 mm and in the downwardly inclined folds amounts to 2–10 mm, the fold height in both of said plates being equal and in the range of 3–10 mm.

4. A contact body according to claim 1, characterized in that the radius of curvature in the upwardly inclined folds amounts to 3–10 mm and in the downwardly inclined folds amounts to 10–25 mm, the fold height in both of said plates being equal and in the range of 10–25 mm.

5. A contact body according to claim 1, characterized in that the contact plates are made of hygroscopic material.

6. A contact body according to claim 1, characterized in that the contact plates are provided with a hygroscopic surface layer.

* * * * *